(12) United States Patent
Kim et al.

(10) Patent No.: US 12,130,385 B2
(45) Date of Patent: Oct. 29, 2024

(54) LIDAR SENSING DEVICE INCLUDING A SCANNER REFLECTOR

(71) Applicant: Hyundai Mobis Co., Ltd., Seoul (KR)

(72) Inventors: Won Gyum Kim, Yongin-si (KR); Sung Eun Jo, Yongin-si (KR); Kyung Rin Kim, Yongin-si (KR); Young Shin Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/401,967

(22) Filed: Aug. 13, 2021

(65) Prior Publication Data

US 2022/0082664 A1   Mar. 17, 2022

Related U.S. Application Data

(63) Continuation of application No. 16/558,760, filed on Sep. 3, 2019, now Pat. No. 11,835,654.

(30) Foreign Application Priority Data

Sep. 4, 2018   (KR) ........................ 10-2018-0105214

(51) Int. Cl.
*G01S 7/481* (2006.01)
*G01S 17/42* (2006.01)

(52) U.S. Cl.
CPC .......... *G01S 7/4817* (2013.01); *G01S 7/4814* (2013.01); *G01S 7/4816* (2013.01); *G01S 17/42* (2013.01)

(58) Field of Classification Search
CPC .... G01S 7/4817; G01S 7/4814; G01S 7/4816; G01S 17/42; G01S 17/931; G01S 17/02
See application file for complete search history.

(56) References Cited

U.S. PATENT DOCUMENTS

| | | |
|---|---|---|
| 5,949,530 A | 9/1999 | Wetteborn |
| 6,671,745 B1 | 12/2003 | Mathur et al. |
| 7,869,005 B2 | 1/2011 | Ossig et al. |
| 8,246,912 B2 | 8/2012 | Cho |

(Continued)

FOREIGN PATENT DOCUMENTS

| | | |
|---|---|---|
| CN | 1564939 | 1/2005 |
| CN | 101726477 | 6/2010 |

(Continued)

OTHER PUBLICATIONS

Non-Final Office Action dated Jun. 7, 2022, issued to U.S. Appl. No. 16/558,760.

(Continued)

*Primary Examiner* — Jennifer D Bennett
(74) *Attorney, Agent, or Firm* — NSIP Law

(57) ABSTRACT

A light detection and ranging ("lidar") sensing device including a sensing light source unit configured to radiate sensing light, a scanner unit configured to reflect the sensing light radiated by the sensing light source unit toward a target and to reflect incident light reflected by the target and integrated with the sensing light source unit, a light-receiving lens configured to transmit the incident light reflected by the scanner unit, a light-receiving reflector configured to reflect the incident light passing through the light-receiving lens, and an optical detection unit on which the incident light reflected by the light-receiving reflector is incident.

4 Claims, 6 Drawing Sheets

(56) References Cited

U.S. PATENT DOCUMENTS

| | | | |
|---|---|---|---|
| 9,897,687 | B1 | 2/2018 | Campbell et al. |
| 9,910,139 | B2 | 3/2018 | Pennecot et al. |
| 11,180,149 | B2 | 11/2021 | Choi et al. |
| 11,835,654 | B2* | 12/2023 | Kim ............... G01S 7/4817 |
| 2002/0003219 | A1 | 1/2002 | Korean |
| 2002/0041231 | A1* | 4/2002 | Drinkard ........... G08B 13/193 340/541 |
| 2008/0238760 | A1 | 10/2008 | Mack |
| 2009/0283666 | A1* | 11/2009 | Tagashira ............ G01S 17/04 250/216 |
| 2016/0011311 | A1 | 1/2016 | Mushimoto et al. |
| 2018/0284282 | A1* | 10/2018 | Hong ................ G01S 17/10 |
| 2019/0120943 | A1* | 4/2019 | Iguchi ............... G01S 17/08 |
| 2020/0072949 | A1* | 3/2020 | Kim ................ G01S 7/4816 |

FOREIGN PATENT DOCUMENTS

| | | | |
|---|---|---|---|
| CN | 101932952 | | 12/2010 |
| CN | 103308926 | | 9/2013 |
| CN | 105759253 | | 7/2016 |
| CN | 205941961 U | * | 2/2017 |
| CN | 206788358 | | 12/2017 |
| CN | 206960658 U | | 2/2018 |
| CN | 108369274 | | 8/2018 |
| EP | 3091369 | | 11/2016 |
| JP | 2012208508 | | 10/2012 |
| KR | 10-2015-0009177 | | 1/2015 |
| KR | 20160078043 A | | 7/2016 |
| KR | 10-2017-0135415 | | 12/2017 |
| KR | 10-2010-0054385 | | 5/2020 |

OTHER PUBLICATIONS

Final Office Action dated Nov. 18, 2022, issued to U.S. Appl. No. 16/558,760.
Non-Final Office Action mailed Mar. 10, 2023, in U.S. Appl. No. 16/558,760.
Office Action dated Nov. 3, 2022, issued to Korean Patent Application No. 10-2018-0105214.
Final Office Action mailed Aug. 2, 2023, in U.S. Appl. No. 16/558,760.
Notice of Allowance issued Oct. 10, 2023, in U.S. Appl. No. 16/558,760.
Office Action dated Sep. 1, 2023 from the Chinese Patent Office for Chinese Patent Application No. 201910826916.5.

* cited by examiner

LIDAR SENSING DEVICE INCLUDING A SCANNER REFLECTOR

CROSS-REFERENCE TO RELATED APPLICATION

This application is a Continuation of U.S. patent application Ser. No. 16/558,760, filed Sep. 3, 2019, which claims priority from the benefit of Korean Patent Application No. 10-2018-0105214, filed on Sep. 4, 2018, which is hereby incorporated by reference for all purposes as if set forth herein.

BACKGROUND

Field

Exemplary embodiments of the present disclosure relates to light detection and ranging ("lidar") sensing devices, and more particularly, to lidar sensing devices capable of improving light reception efficiency and reducing the number of parts by removing a cover area.

Discussion of the Background

With the development of the technology of a vehicle, a function, such as autonomous parking in addition to autonomous driving, is required. In order to perform such a function, the need of a lidar sensor is increased.

The lidar sensor is mounted on the bumper of a vehicle, and detects a thing or structure by detecting the anterior and posterior of the vehicle. The lidar sensor is positioned within glass or the structure of a vehicle body. The lidar sensor detects a target using light.

The lidar sensor includes a transmission (Tx)-optical system transmitting light and a reception (Rx)-optical system receiving incident light. The Tx-optical system includes a laser generator, a transmission scope tube, a transmission lens, and a transmission reflector. The Rx-optical system includes a reception lens, a reflection mirror, and a laser detector.

In the conventional lidar sensor, however, a received focal length is formed in the detector because light passing through the reception lens is reflected by the reflection mirror. Accordingly, there is a problem in that the number of parts increases because the reflection mirror for bending an optical path is positioned in order to reduce the size of the lidar sensor.

Furthermore, there occurs a cover area in which a part of the reception area of the Rx-optical system is covered by the transmission scope tube and transmission reflector of the Tx-optical system. Accordingly, light reception efficiency of the lidar sensor may be reduced.

Accordingly, there is a demand to solve the problems.

Background Technology of the present disclosure is disclosed in Korean Patent Application Publication No. 2015-0009177 (Jan. 26, 2015, entitled "LIDAR Sensor System").

The above information disclosed in this Background section is only for enhancement of understanding of the background of the invention and, therefore, it may contain information that does not constitute prior art.

SUMMARY

Exemplary embodiments of the present invention provide a lidar sensing device capable of improving light reception efficiency and reducing the number of parts by removing a cover area.

In an embodiment, a lidar sensing device includes a sensing light source unit configured to radiate sensing light, a scanner unit configured to reflect the sensing light radiated by the sensing light source unit toward a target and to reflect incident light reflected by the target and integrated with the sensing light source unit, a light-receiving lens configured to transmit the incident light reflected by the scanner unit, a light-receiving reflector configured to reflect the incident light passing through the light-receiving lens, and an optical detection unit on which the incident light reflected by the light-receiving reflector is incident.

The scanner unit may include a light-transmitting reflector configured to reflect the sensing light radiated by the sensing light source unit toward the target, a scanner reflector configured to reflect the incident light reflected by the target toward the light-receiving lens and integrated with the light-transmitting reflector and the sensing light source unit, and a scanner driver connected to the scanner reflector to rotate the scanner reflector.

The sensing light source unit may include a scope tube integrated with the scanner reflector, a light source positioned within the scope tube to radiate the sensing light toward the light-transmitting reflector, and a light-transmitting lens unit positioned on the output side of the light source to collimate the sensing light radiated by the light source so that the sensing light passes through the light-transmitting reflector.

The light-transmitting lens unit may include a first light-transmitting lens positioned within the scope tube and a second light-transmitting lens positioned within the scope tube, wherein the sensing light passing through the first light-transmitting lens is incident on the second light-transmitting lens.

The light-transmitting lens unit may include a first light-transmitting lens positioned within the scope tube and a second light-transmitting lens integrated with the scanner reflector, wherein the sensing light passing through the first light-transmitting lens is incident on the second light-transmitting lens.

The scanner unit may include a scanner reflector configured to reflect the sensing light radiated by the sensing light source unit toward the target and to reflect the incident light reflected by the target toward the light-receiving lens and integrated with the sensing light source unit, and a scanner driver connected to the scanner reflector to rotate the scanner reflector.

The sensing light source unit may include a scope tube integrated with the scanner reflector, a light source positioned within the scope tube to radiate the sensing light toward the target, and a light-transmitting lens unit positioned on the output side of the light source to collimate the sensing light radiated by the light source.

The light-transmitting lens unit may include a first light-transmitting lens positioned within the scope tube and a second light-transmitting lens positioned within the scope tube and configured to input the sensing light, passing through the first light-transmitting lens, to the scanner reflector.

The light-transmitting lens unit may include a first light-transmitting lens positioned within the scope tube and a second light-transmitting lens integrated with the scanner reflector and configured to input the sensing light, passing through the first light-transmitting lens, to the scanner reflector.

The lidar sensing device may further include an interference filter positioned between the light-receiving reflector and the optical detection unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
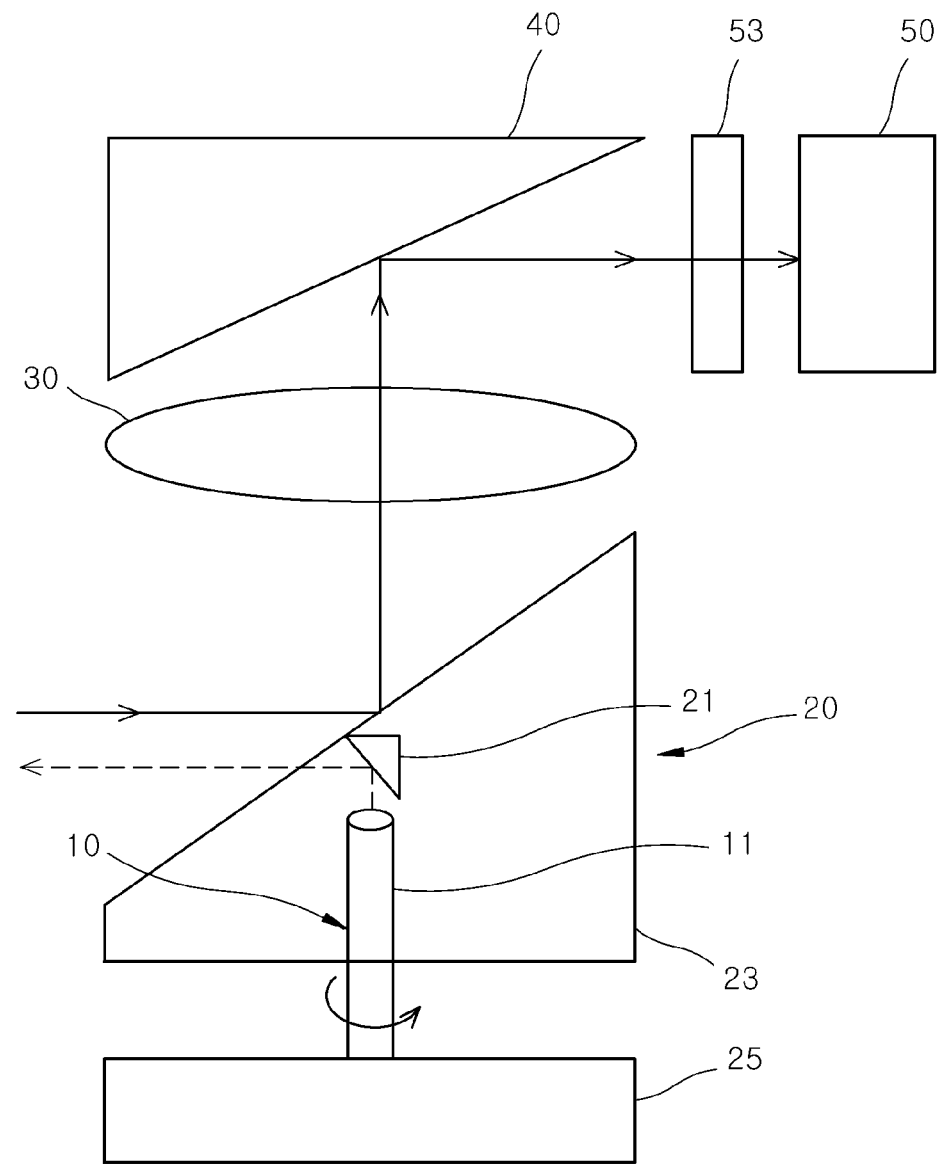
FIG. 1 illustrates the configuration of a lidar sensing device according to a first embodiment of the present disclosure.

Hereinafter, a light detection and ranging ("lidar") sensing device according to the present disclosure will be described below with reference to the accompanying drawings through various examples of embodiments. The thickness of lines or the size of elements shown in the drawings in a process of describing the lidar sensing device may have been exaggerated for the clarity of a description and for convenience' sake. Terms to be described below have been defined by taking into consideration their functions in the present invention, and may be different depending on a user or operator's intention or practice. Accordingly, such terms should be interpreted based on the overall contents of this specification.

First, a lidar sensing device according to a first embodiment of the present disclosure will be described.

Figure 2:
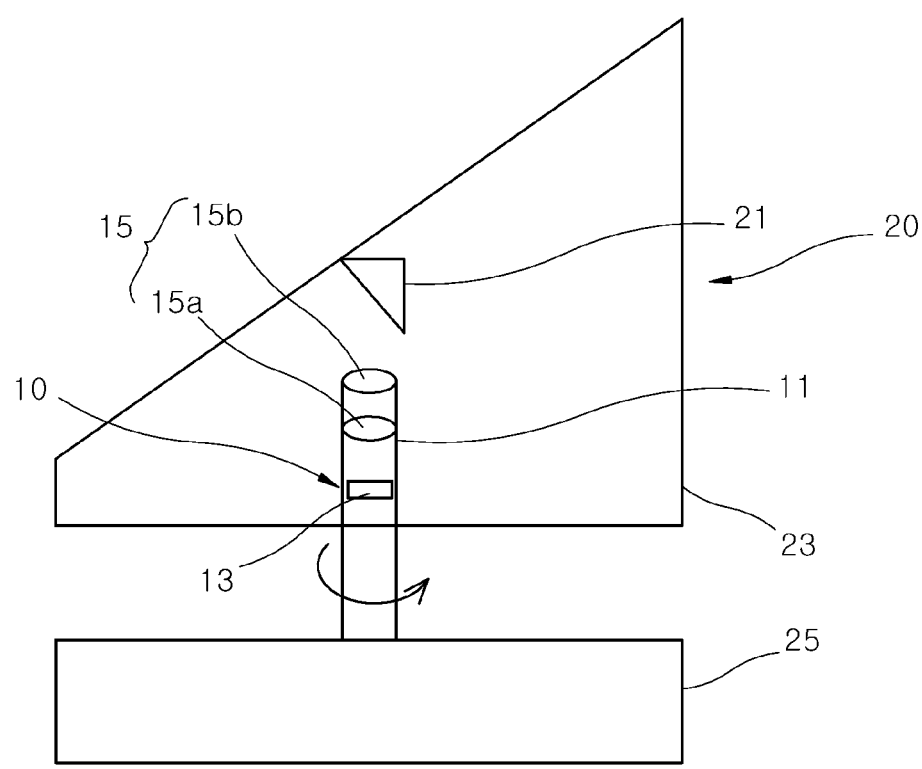
FIG. 2 illustrates the configuration of a sensing light source unit and a scanner unit in the lidar sensing device according to the first embodiment of the present disclosure.

FIG. 1 illustrates the configuration of a lidar sensing device according to a first embodiment of the present disclosure. FIG. 2 illustrates the configuration of a sensing light source unit and a scanner unit in the lidar sensing device according to the first embodiment of the present disclosure.

Referring to FIGS. 1 and 2, the lidar sensing device according to the first embodiment of the present disclosure includes a sensing light source unit 10, a scanner unit 20, a light-receiving lens 30, a light-receiving reflector 40 and an optical detection unit 50.

The lidar sensing device includes a Tx-optical system and an Rx-optical system. The Tx-optical system includes a sensing light source unit 10 and a scanner unit 20. The Rx-optical system includes a light-receiving lens 30, a light-receiving reflector 40 and an optical detection unit 50. In FIG. 1, sensing light is indicated by a dotted line, and incident light is indicated by a solid line.

The sensing light source unit 10 radiates sensing light. The sensing light source unit 10 includes a scope tube 11, a light source 13 and a light-transmitting lens unit 15.

The scope tube 11 may be formed in a cylindrical shape. The scope tube 11 prevents sensing light, radiated by the light source 13, from being spread to the surroundings.

The light source 13 is positioned within the scope tube 11 so that sensing light is radiated toward a light-transmitting reflector 21. The light-transmitting lens unit 15 is positioned on the output side of the light source 13 so that sensing light radiated by the light source 13 is collimated and transmitted to the light-transmitting reflector 21. Output of sensing light can be improved because the light-transmitting lens unit 15 collimates sensing light into a parallel beam.

The light-transmitting lens unit 15 includes a first light-transmitting lens 15a and a second light-transmitting lens 15b. The first light-transmitting lens 15a is positioned within the scope tube 11. The first light-transmitting lens 15a is fabricated using optical materials, such as crystal, glass or transparent synthetic resin. The second light-transmitting lens 15b is positioned within the scope tube 11. Sensing light passing through the first light-transmitting lens 15a is incident on the second light-transmitting lens 15b. The second light-transmitting lens 15b is fabricated using optical materials, such as crystal, glass or transparent synthetic resin. A receiving-cover area can be prevented from being formed in the light-receiving lens 30 due to the first light-transmitting lens 15a and the second light-transmitting lens 15b because the first light-transmitting lens 15a and the second light-transmitting lens 15b are disposed within the scope tube 11.

The scanner unit 20 reflects sensing light, radiated by the sensing light source unit 10, toward a target, and reflects incident light, reflected by the target, toward the light-receiving lens 30. The scanner unit 20 is integrated with the sensing light source unit 10. A reflection layer may be formed in the scanner unit 20 in order to improve light reflection efficiency. The number of parts of the lidar sensing device can be reduced because the scanner unit 20 is integrated with the sensing light source unit 10. Furthermore, a receiving-cover area can be prevented from being formed in the light-receiving lens 30 due to the sensing light source unit 10 because the sensing light source unit 10 is integrated with the scanner unit 20. Furthermore, the size of the lidar sensing device can be reduced because the length of an optical passage between the sensing light source unit 10 and the scanner unit 20 is reduced.

The scanner unit 20 includes the light-transmitting reflector 21, a scanner reflector 23 and a scanner driver 25.

The light-transmitting reflector 21 reflects sensing light, radiated by the sensing light source unit 10, toward a target. The light-transmitting reflector 21 is positioned in line with the sensing light source unit 10, the light-receiving lens 30, and the light-receiving reflector 40. The light-transmitting reflector 21 may be processed using optical materials, such as crystal, glass or transparent synthetic resin.

The scanner reflector 23 reflects incident light, reflected by a target, toward the light-receiving lens 30, and is integrated the light-transmitting reflector 21 and the sensing light source unit 10. A reflection layer (not shown) is formed in the scanner reflector 23 in order to improve light reflection efficiency. A receiving-cover area attributable to the scanner reflector 23 can be removed from the light-receiving lens 30 because the scanner reflector 23 is integrated with the light-transmitting reflector 21 and the sensing light source unit 10. As light reception efficiency increases, a maximum detection distance of the lidar sensing device can be further increased. Furthermore, the number of parts and size of the lidar sensing device can be reduced because the scanner reflector 23, the light-transmitting reflector 21, and the sensing light source unit 10 are integrated into a single optical module.

The scanner driver 25 is connected to the scanner reflector 23 to rotate the scanner reflector 23. The reflection angles of sensing light and incident light may be different depending on an angle of the scanner reflector 23 because the scanner driver 25 rotates the scanner reflector 23.

A motor unit may be used as the scanner driver 25. The motor unit may include an encoder (not shown) or may be connected to the encoder. The encoder measures the number of revolutions, rotation speed, and a rotation angle of the motor unit, and provides them to a controller.

The light-receiving lens 30 transmits incident light reflected by the scanner unit 20. The light-receiving lens 30 may be processed using optical materials, such as crystal, glass or transparent synthetic resin. An anti-reflective coating layer may be formed in the light-receiving lens 30 in order to prevent incident light from being reflected.

The light-receiving reflector 40 reflects incident light passing through the light-receiving lens 30. The light-receiving reflector 40 may be positioned in line with the light-receiving lens 30 and the scanner reflector 23.

Incident light reflected by the light-receiving reflector 40 is incident on the optical detection unit 50. The optical detection unit 50 may detect the location and distance of a target as incident light is incident thereon.

The lidar sensing device further includes an interference filter 53 positioned between the light-receiving reflector 40 and the optical detection unit 50. The interference filter 53 filters light having a specific wavelength. The location and distance of a target can be precisely detected by the optical detection unit 50 because the interference filter 53 inputs light within a given wavelength band to the optical detection unit 50.

A lidar sensing device according to a second embodiment of the present disclosure will be described. Since the second embodiment is substantially the same as the first embodiment except a sensing light source unit 10, the same element is assigned the same reference numeral and a description thereof is omitted.

Figure 3:
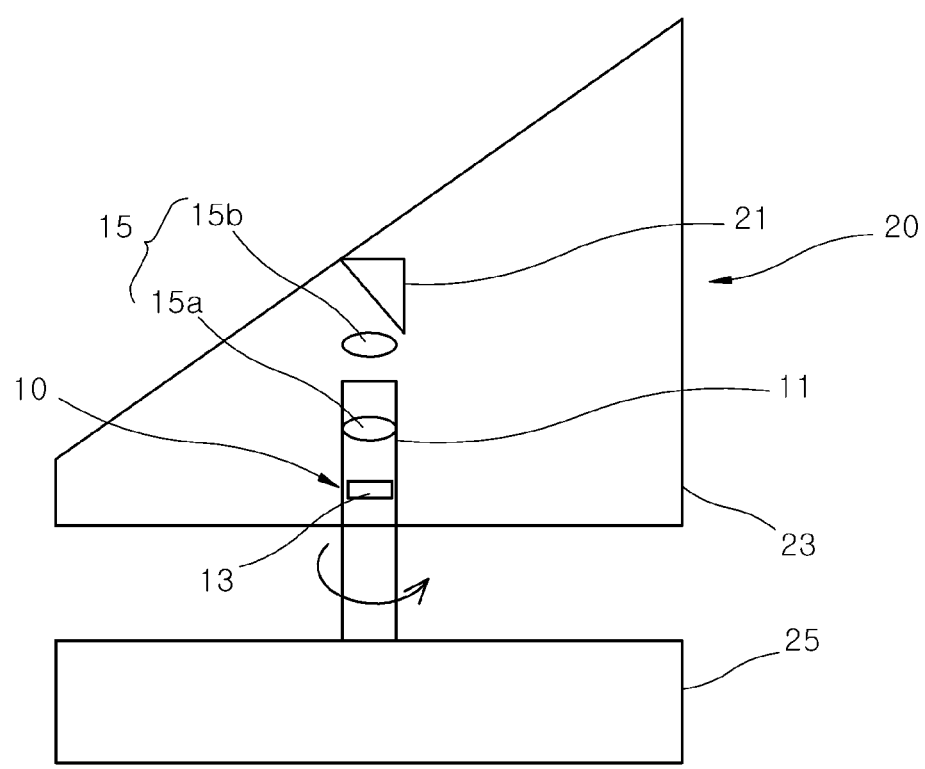
FIG. 3 illustrates the configuration of a sensing light source unit and a scanner unit in a lidar sensing device according to a second embodiment of the present disclosure.

FIG. 3 illustrates the configuration of the sensing light source unit 10 and a scanner unit in the lidar sensing device according to the second embodiment of the present disclosure.

Referring to FIG. 3, the sensing light source unit 10 of the lidar sensing device according to the second embodiment of the present disclosure includes a scope tube 11, a light source 13 and a light-transmitting lens unit 15.

The scope tube 11 may be formed in a cylindrical shape. The scope tube 11 prevents sensing light, radiated by the light source 13, from being spread to the surroundings.

The light source 13 is positioned within the scope tube 11. The light-transmitting lens unit 15 is positioned on the output side of the light source 13 so that sensing light radiated by the light source 13 is collimated. Output of sensing light can be improved because the light-transmitting lens unit 15 collimates the sensing light into a parallel beam.

The light-transmitting lens unit 15 includes a first light-transmitting lens 15a and a second light-transmitting lens 15b.

At least one first light-transmitting lens 15a is positioned within the scope tube 11. The first light-transmitting lens 15a is fabricated using optical materials, such as crystal, glass or transparent synthetic resin.

The second light-transmitting lens 15b is integrated with a scanner reflector 23. At least one second light-transmitting lens 15b is positioned so that sensing light passing through the first light-transmitting lens 15a is incident thereon. The second light-transmitting lens 15b, the scanner reflector 23 and a light-transmitting reflector 21 may be processed using optical materials, such as crystal, glass or transparent synthetic resin. The number of parts of the lidar sensing device can be reduced because the second light-transmitting lens 15b, the scanner reflector 23 and the light-transmitting reflector 21 are integrated into a single optical module. Furthermore, a receiving-cover area can be prevented from being formed in a light-receiving lens 30 due to the scope tube 11 and the light-transmitting reflector 21. Furthermore, the size of the lidar sensing device can be reduced because the distance between the second light-transmitting lens 15b and the light-transmitting reflector 21 can be reduced.

A lidar sensing device according to a third embodiment of the present disclosure will be described.

Figure 4:
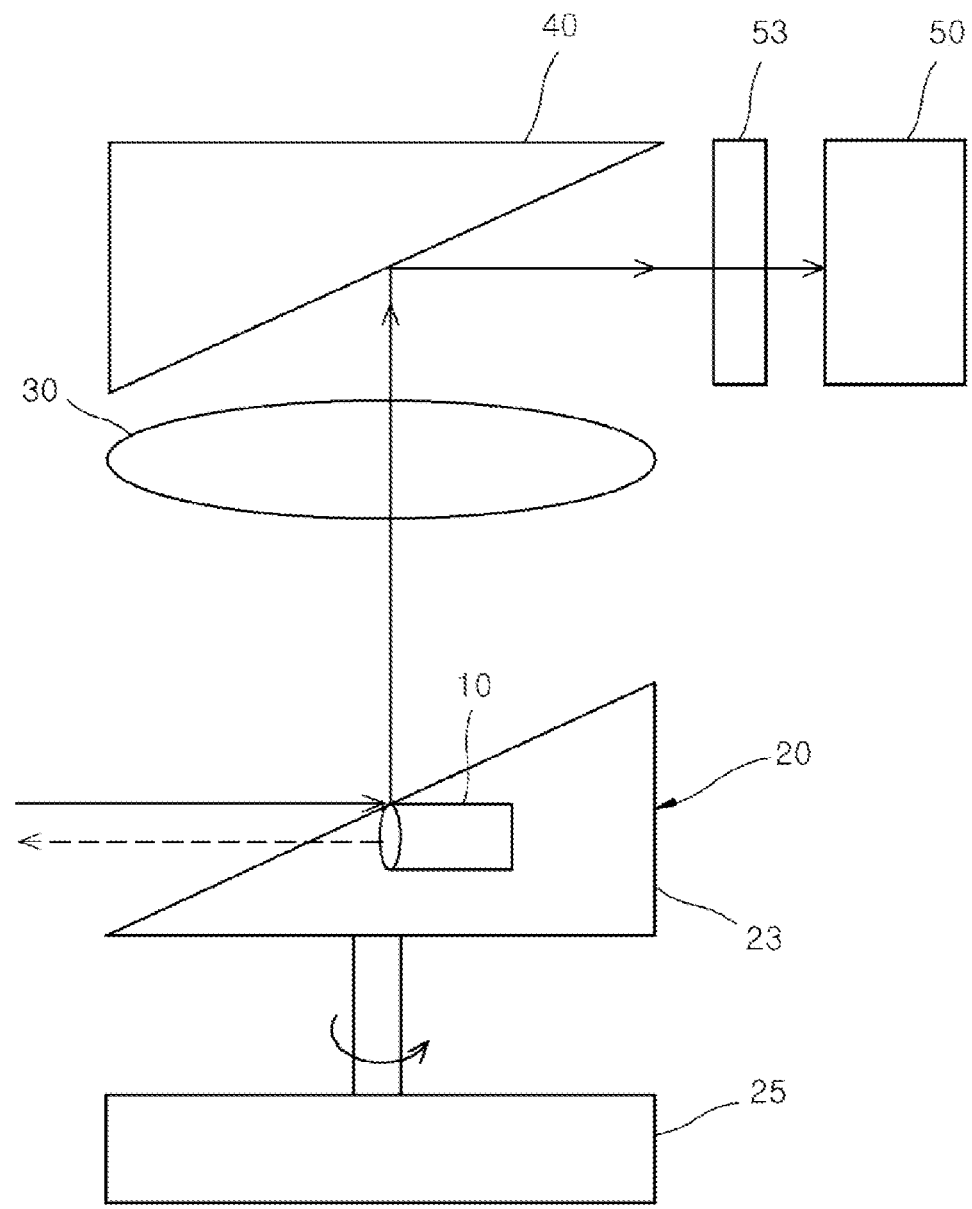
FIG. 4 illustrates the configuration of a lidar sensing device according to a third embodiment of the present disclosure.
Figure 5:
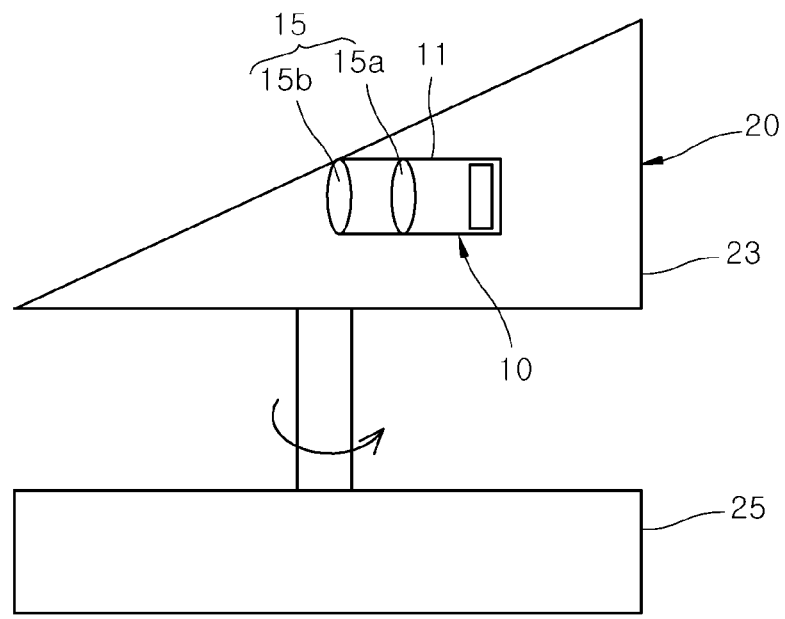
FIG. 5 illustrates the configuration of a sensing light source unit and a scanner unit in the lidar sensing device according to the third embodiment of the present disclosure.

FIG. 4 illustrates the configuration of the lidar sensing device according to the third embodiment of the present disclosure. FIG. 5 illustrates the configuration of a sensing light source unit and a scanner unit in the lidar sensing device according to the third embodiment of the present disclosure.

Referring to FIGS. 4 and 5, the lidar sensing device according to the third embodiment of the present disclosure includes a sensing light source unit 10, a scanner unit 20, a light-receiving lens 30, a light-receiving reflector 40 and an optical detection unit 50.

The sensing light source unit 10 radiates sensing light. The sensing light source unit 10 includes a scope tube 11, a light source 13 and a light-transmitting lens unit 15.

The scope tube 11 may be formed in a cylindrical shape. The scope tube 11 prevents sensing light, radiated by the light source 13, from being spread to the surroundings.

The light source 13 is positioned within the scope tube 11 so that sensing light is radiated toward a light-transmitting reflector 21. The light-transmitting lens unit 15 is positioned on the output side of the light source 13 so that sensing light radiated by the light source 13 is collimated and incident on a scanner reflector 23 of the scanner unit 20. Output of sensing light can be improved because the light-transmitting lens unit 15 collimates sensing light into a parallel beam.

The light-transmitting lens unit 15 includes a first light-transmitting lens 15a and a second light-transmitting lens 15b. The first light-transmitting lens 15a is positioned within the scope tube 11. The first light-transmitting lens 15a is fabricated using optical materials, such as crystal, glass or transparent synthetic resin. The second light-transmitting lens 15b is positioned within the scope tube 11, and inputs sensing light, passing through the first light-transmitting lens 15a, to the scanner reflector 23. The second light-transmitting lens 15b is fabricated using optical materials, such as crystal, glass or transparent synthetic resin. A receiving-cover area can be prevented from being formed in the light-receiving lens 30 due to the first light-transmitting lens 15a and the second light-transmitting lens 15b because the first light-transmitting lens 15a and the second light-transmitting lens 15b are positioned within the scope tube 11.

The scanner unit 20 reflects sensing light, radiated by the sensing light source unit 10, toward a target, and reflects incident light, reflected by the target, toward the light-receiving lens 30. A reflection layer may be formed in the scanner unit 20 in order to improve light reflection efficiency. The number of parts of the lidar sensing device can be reduced because the scanner unit 20 is integrated with the sensing light source unit 10. Furthermore, a receiving-cover area can be fully removed from the light-receiving lens 30 because the sensing light source unit 10 is integrated with the scanner unit 20. Furthermore, the size of the lidar sensing device can be reduced because the length of an optical passage between the sensing light source unit 10 and the scanner unit 20 can be reduced.

The scanner unit 20 includes the scanner reflector 23 and a scanner driver 25.

The scanner reflector 23 reflects sensing light, radiated by the sensing light source unit 10, toward a target, and reflects incident light, reflected by the target, toward the light-receiving lens 30. The scanner reflector 23 is integrated with the sensing light source unit 10. A reflection layer (not shown) is formed in the scanner reflector 23 in order to improve light reflection efficiency.

The scanner reflector 23 reflects sensing light, radiated by the sensing light source unit 10, toward a target. Accordingly, a light-transmitting reflector (refer to 21 in the first embodiment) for reflecting sensing light toward a target does not need to be positioned. Accordingly, the number of parts and size of the lidar sensing device can be reduced.

Furthermore, a receiving-cover area can be fully removed from the light-receiving lens 30 because the scanner reflector 23 is integrated with the sensing light source unit 10. Furthermore, as light reception efficiency increases, a maximum detection distance of the lidar sensing device can be further increased. Furthermore, the number of parts and size of the lidar sensing device can be reduced because the scanner reflector 23 and the sensing light source unit 10 are integrated into a single optical module.

The scanner driver 25 is connected to the scanner reflector 23 to rotate the scanner reflector 23. Reflection angles of sensing light and incident light may be changed depending on an angle of the scanner reflector 23 because the scanner driver 25 rotates the scanner reflector 23.

A motor unit may be used as the scanner driver 25. The motor unit may include an encoder (not shown) or may be connected to the encoder. The encoder measures the number of revolutions, rotation speed, and rotation angle of the motor unit, and provides them to a controller.

The light-receiving lens 30 transmits incident light reflected by the scanner unit 20. The light-receiving lens 30 may be processed using optical materials, such as crystal, glass or transparent synthetic resin. An anti-reflective coating layer may be formed in the light-receiving lens 30 in order to prevent incident light from being reflected.

The light-receiving reflector 40 reflects incident light passing through the light-receiving lens 30. The light-receiving reflector 40 may be positioned in line with the light-receiving lens 30 and the scanner reflector 23.

Incident light reflected by the light-receiving reflector 40 is incident on the optical detection unit 50. The optical detection unit 50 may detect the location and distance of a target as incident light is incident thereon.

The lidar sensing device further includes an interference filter 53 positioned between the light-receiving reflector 40 and the optical detection unit 50. The interference filter 53 filters light with a specific wavelength. The optical detection unit 50 can precisely detect the location and distance of a target because the interference filter 53 inputs light within a given wavelength band to the optical detection unit 50.

A lidar sensing device according to a fourth embodiment of the present disclosure will be described below. Since the fourth embodiment is substantially the same as the third embodiment except a sensing light source unit 10, the same element is assigned the same reference numeral and a description thereof is omitted.

Figure 6:
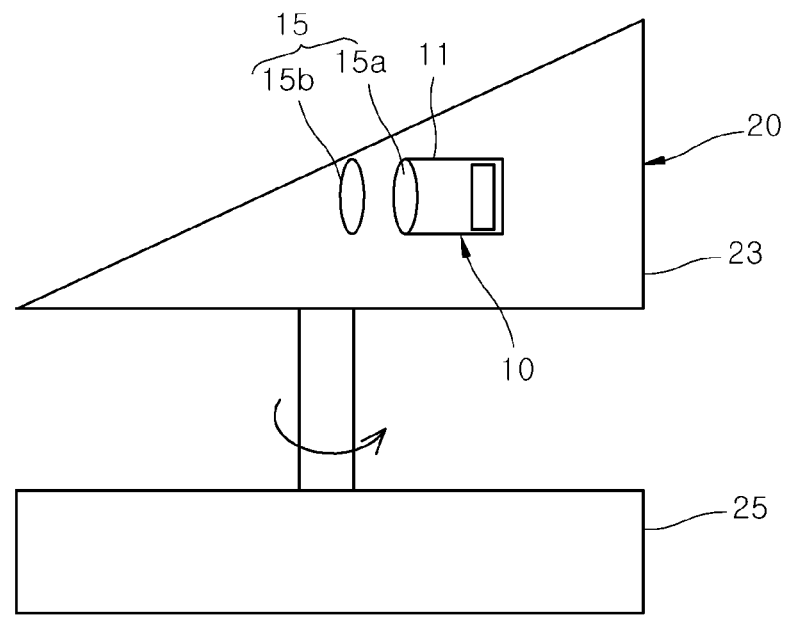
FIG. 6 illustrates the configuration of a sensing light source unit and a scanner unit in a lidar sensing device according to a fourth embodiment of the present disclosure.

FIG. 6 illustrates the configuration of the sensing light source unit 10 and a scanner unit in the lidar sensing device according to the fourth embodiment of the present disclosure.

Referring to FIG. 6, the sensing light source unit 10 of the lidar sensing device according to the fourth embodiment of the present disclosure includes a scope tube 11, a light source 13 and a light-transmitting lens unit 15.

The scope tube 11 may be formed in a cylindrical shape. The scope tube 11 prevents sensing light, radiated by the light source 13, from being spread to the surroundings.

The light source 13 is positioned within the scope tube 11. The light-transmitting lens unit 15 is positioned on the output side of the light source 13 so that sensing light radiated by the light source 13 is collimated. Output of sensing light can be improved because the light-transmitting lens unit 15 collimates the sensing light into a parallel beam.

The light-transmitting lens unit 15 includes a first light-transmitting lens 15a and a second light-transmitting lens 15b.

At least one first light-transmitting lens 15a is positioned within the scope tube 11. The first light-transmitting lens 15a is fabricated using optical materials, such as crystal, glass or transparent synthetic resin.

The second light-transmitting lens 15b is integrated with a scanner reflector 23. At least one second light-transmitting lens 15b is positioned so that sensing light passing through the first light-transmitting lens 15a is incident thereon. The second light-transmitting lens 15b and the scanner reflector 23 may be processed using the same optical materials, such as crystal, glass or transparent synthetic resin. The number of parts of the lidar sensing device can be reduced because the second light-transmitting lens 15b and the scanner reflector 23 are integrated into a single optical module. Furthermore, a receiving-cover area can be prevented from being formed in the light-receiving lens 30 due to the scope tube 11 and the second light-transmitting lens 15b. Furthermore, the size of the lidar sensing device can be reduced because a light-transmitting reflector 21 can be omitted.

The number of parts of the lidar sensing device can be reduced because the sensing light source unit 10 and the scanner unit 20 are integrated into a single optical module as described above.

Furthermore, light reception efficiency can be improved because a cover area attributable to the sensing light source unit 10 or the light-transmitting reflector 21 can be fully removed from the light-receiving lens 30. A maximum detection distance of the lidar sensing device can be further increased as light reception efficiency is improved.

Furthermore, the size of the lidar sensing device can be reduced because the distance of a light passage is reduced in a light-transmitting optical system.

According to the present disclosure, the number of parts of the lidar sensing device can be reduced because the sensing light source unit and the scanner unit are integrated into a single optical module.

Furthermore, according to the present disclosure, light reception efficiency can be improved because a cover area attributable to the sensing light source unit or the light-transmitting reflector can be fully removed from the light-receiving lens. A maximum detection distance of the lidar sensing device can be further increased as light reception efficiency is improved.

Furthermore, according to the present disclosure, the size of the lidar sensing device can be reduced because the distance of a light passage can be reduced in a light-transmitting optical system.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A light detection and ranging ("lidar") sensing device, comprising:
    a sensing light source device configured to radiate sensing light;
    a scanner device comprising a scanner reflector including a scanner-side reflecting surface firstly reflecting incident light reflected from a target,
    a light-receiving lens including an anti-reflective coating configured to transmit the incident light firstly reflected by the scanner-side reflecting surface;
    a light-receiving reflector configured to secondly reflect the incident light passing through the light-receiving lens;
    an interference filter configured to filter the incident light secondly reflected by the light-receiving reflector to pass light having a specific wavelength range; and
    an optical detector on which the incident light secondly reflected by the light-receiving reflector, and filtered by the interference filter, is incident,
    wherein the sensing light passes through a virtual plane including the scanner-side reflecting surface, and the sensing light passing through the virtual plane is directed toward the target,
    wherein the scanner device comprises a light-transmitting reflector for reflecting the sensing light irradiated from the sensing light source toward the target,
    wherein the sensing light source device and the light-transmitting reflector are integrated with the scanner reflector,
    wherein a surface on which the incident light reflected from the target is reflected and the virtual plane form a single surface, and
    wherein the light-transmitting reflector is positioned in line with the sensing light source device, the light-receiving lens, and the light-receiving reflector.

2. The lidar sensing device of claim 1, wherein the sensing light source device is disposed inside the scanner device.

3. The lidar sensing device of claim 1, wherein at least a portion of the path of the sensing light passes through the inside of the scanner device.

4. The lidar sensing device of claim 1, wherein:
    the scanner device further comprises a scanner driving unit connected to the scanner reflector to rotate the scanner reflector; and
    the incident light reflected from the target is reflected toward the light-receiving lens by the scanner reflector.

* * * * *